(12) United States Patent
Kaihara et al.

(10) Patent No.: US 8,122,556 B2
(45) Date of Patent: Feb. 28, 2012

(54) CLEANING DEVICE

(75) Inventors: Shoji Kaihara, Yokohama (JP);
Takanori Honda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1502 days.

(21) Appl. No.: 11/298,379

(22) Filed: Dec. 8, 2005

(65) Prior Publication Data

US 2006/0127083 A1   Jun. 15, 2006

(30) Foreign Application Priority Data

Dec. 10, 2004 (JP) .................................. 2004-359120
Dec. 14, 2004 (JP) .................................. 2004-362054

(51) Int. Cl.
*A47L 25/00* (2006.01)
(52) U.S. Cl. .................................................. 15/104.002
(58) Field of Classification Search ............. 15/104.001, 15/104.002; 101/405; 264/327.7, 327.8; *G03B 19/00, 17/56; A47L 13/38; B08B 1/00; H04N 5/225*
See application file for complete search history.

(56) References Cited

U.S. PATENT DOCUMENTS

| 4,075,730 | A | * | 2/1978 | Siemund | .......................... | 15/245 |
| 4,128,909 | A | * | 12/1978 | Kawabe et al. | .......... | 15/104.002 |
| 4,397,581 | A | * | 8/1983 | Jarvis | .............................. | 404/97 |
| 2004/0031504 | A1 | * | 2/2004 | Stelcher | .......................... | 134/6 |
| 2007/0201865 | A1 | | 8/2007 | Sugihara | | |

FOREIGN PATENT DOCUMENTS

| JP | 5-085361 | | 11/1993 |
| JP | 2003-018440 | | 1/2003 |
| JP | 2003-220014 | | 8/2003 |
| JP | 2003-290118 | A | 10/2003 |
| JP | 2004-326095 | A | 11/2004 |

OTHER PUBLICATIONS

The above references were cited in a May 11, 2009 Japanese Office Action that issued in Japanese Patent Application No. 2004-362054, which is enclosed without translation.

* cited by examiner

*Primary Examiner* — Lee D Wilson
*Assistant Examiner* — Jamal Daniel
(74) *Attorney, Agent, or Firm* — Cowan, Liebowitz & Latman, P.C.

(57) ABSTRACT

A cleaning device is used to remove an alien substance adhering to a surface of an optical member arranged in front of a solid image sensing device inside a lens replaceable digital single-lens reflex camera. The cleaning device includes a supporting member that is supported by a user, and an elastic member having an adhesive surface 12 and being formed in a substantially square shape larger than equally divided four parts of a 135 format of a camera and smaller than an APS-C format of the camera.

5 Claims, 7 Drawing Sheets

CLEANING DEVICE

FIELD OF THE INVENTION

The present invention relates to a cleaning device for an optical device such as a digital camera, and, in particular to a cleaning device for removing an alien substance adhering to a surface of an optical member built in the optical device or near the optical member.

BACKGROUND OF THE INVENTION

When an alien substance such as dust is present near a focal plane of a lens of a camera, a shadow of the alien substance is reflected on a solid image sensing device. Such an alien substance is actually a fine substance of a size equal to or smaller than several tens µm. It is considered that the alien substance adheres to near the focal plane because dust enters the camera from the outside when the lens is replaced or, according to an operation of a shutter or a mirror in the camera, fine abrasion powder of resin or the like forming the shutter or the mirror is generated. When such dust enters between a cover glass for protection of the solid image sensing device and an optical filer such as an infrared cut filter or an optical low-pass filter (hereinafter, "LPF") disposed in front of the cover glass, the camera has to be disassembled in order to remove the dust. Therefore, it is extremely effective to adopt a seal structure to prevent the dust from entering between the cover glass of the solid image sensing device and the optical filter.

However, in a case where dust adheres to a surface on a side of the optical filter opposed to the solid image sensing device and a surface on an opposite side, it is difficult to remove the dust because the dust is fine. In a case where a position to which the dust adheres is near the focal plane, there still remains a problem in that a shadow of the dust is clearly projected on the solid image sensing device.

In particular, in recent years, the number of pixels of a captured image has been increased in a lens replaceable digital single-lens reflex camera as well. A digital single-lens reflex camera of a 135 format (135 size) having a resolution of 10 million pixels is on the market. When the number of pixels increases to make it possible to obtain high-definition and clear images, there is an increasing demand that a photographed high-resolution image should be enlarged and displayed for confirmation. If the image of high resolution is enlarged and displayed, a shadow of an alien substance is conspicuous all the more. Thus, an alien substance adhering to near a focal plane of a lens of the camera is regarded as a problem.

Therefore, in order to solve such a problem, there is a camera in which a surface of a cover glass of a solid image sensing device or an outermost surface of a dust-proof structure is cleaned by a wiper (see Japanese Patent Application Laid-open No. 2003-018440). If such a constitution of such camera is adopted, it is possible to remove dust adhering to the surface of the cover glass of the solid image sensing device or the outermost surface of the dust-proof structure (e.g., a surface of an optical filter) without removing the lens and disassembling the camera.

However, in the constitution described in Japanese Patent Application Laid-open No. 2003-018440, since the surface of the cover glass of the solid image sensing device or the outermost surface of the dust-proof structure is rubbed by the wiper, it is likely that hard dust like metal powder scratches the surface of the cover glass of the solid image sensing device or the outermost surface of the dust-proof structure. In addition, since a mechanism for disposing the wiper is required, a size of the camera increases.

There is, therefore, a camera in which dust is removed from an object to be cleaned by a cohesive cleaning stick (Japanese Utility Model Application Publication No. Hei 05-085361 and Japanese Patent Application Laid-open No. 2003-220014). The camera uses the cohesive cleaning stick including a cleaning portion having both cushioning properties and cohesiveness with a cohesive member disposed at one end of a cylindrical member via a cushion material. Alternatively, the camera uses a cohesive cleaning stick with a rubber-based adhesive applied at one end of a cylindrical member. Dust adhering to a surface of a cover glass of a solid image sensing device or a surface of an optical filter is removed by the cleaning stick. In a case where cleaning is performed using such a cohesive cleaning stick, it is relatively easy to remove dust if an amount of dust adhering to the surface of the cover glass of the solid image sensing device or the surface of the optical filter is small. However, in a case where a large amount of dust dispersing over almost the entire area of the cover glass or the filter is removed, it is necessary to perform removal operation a large number of times because the cohesive cleaning stick has to be brought into contact with each piece of dust. This makes operation troublesome.

Japanese Patent Application Laid-open No. 2003-220014 describes cleaning performed by rotating a cohesive member having a substantially circular section. However, since it is impossible to bring the substantially circular cohesive member into contact with an alien substance adhering to a corner part of a quadrilateral, it is impossible to remove the alien substance adhering to the corner part. Moreover, if the cohesive member is rotated, it is likely to cause wiping unevenness. Since there are various sizes of a solid image sensing device (a 135 full size, an APS-C size, etc.), in order to make the cohesive member applicable to all the sizes, it is desirable to prepare cleaning portions of plural sizes such that a user can select one out of the cleaning portion appropriately and mount the cleaning portion on the cohesive member to perform cleaning.

However, as described above, it is necessary to form the cleaning portion coming into contact with an optical member with a soft member to prevent the cleaning portion from damaging the optical member. However, in a case where such a soft member can be replaced and is mounted on a hard support portion, it is likely that the cleaning portion comes off the support portion during cleaning work. If such a situation occurs, then it is likely that a tip of the hard support portion, from which the cleaning portion has come off, scratches a surface of a cover glass of the solid image sensing device or a surface of an optical filter.

SUMMARY OF THE INVENTION

It is an object of the invention to solve the problems of the conventional techniques.

A feature of the invention is to provide a cleaning device that can surely remove an alien substance adhering in a camera with simple operation.

Another feature of the invention is to provide a cleaning device that can surely remove an alien substance adhering in a camera with simple operation and in which a cohesive portion is not likely to drop to damage an optical member during cleaning operation.

According to the present invention, there is provided with a cleaning device for removing an alien substance adhering to a surface of an optical member that is exposed in a state of which the optical member is viewed through an aperture of a lens mount, the cleaning device comprising:

a cylindrical supporting member configured to be supported by a user; and an elastic member provided at one tip of the supporting member, having a surface being cohesiveness and a substantially rectangular shape, configured to be contacted with the optical member, wherein a size of the surface is larger than equally divided four parts of a 135 format of a camera and is substantially equal to or smaller than an APS-C format of the camera.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the invention will be hereinafter explained in detail with reference to the accompanying drawings. Note that the embodiment described below does not limit the claimed invention and all combinations of characteristics explained in the embodiment are not always essential for means for resolution of the invention.

Figure 1A:
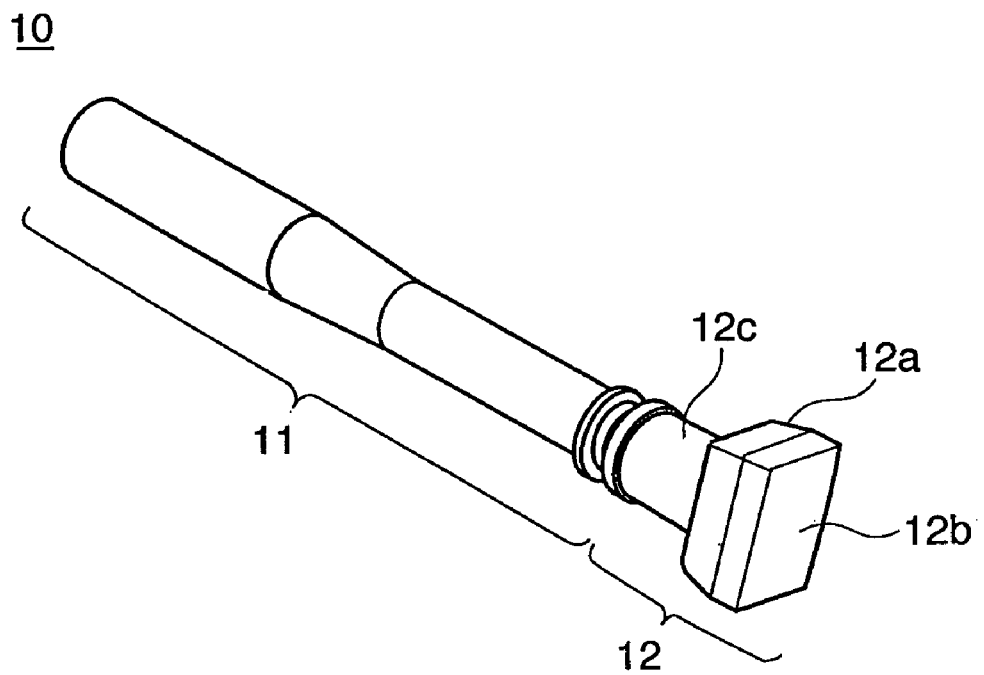
FIGS. 1A and 1B depict schematic perspective views showing a constitution of a cleaning device according to an embodiment of the invention.
Figure 1B:
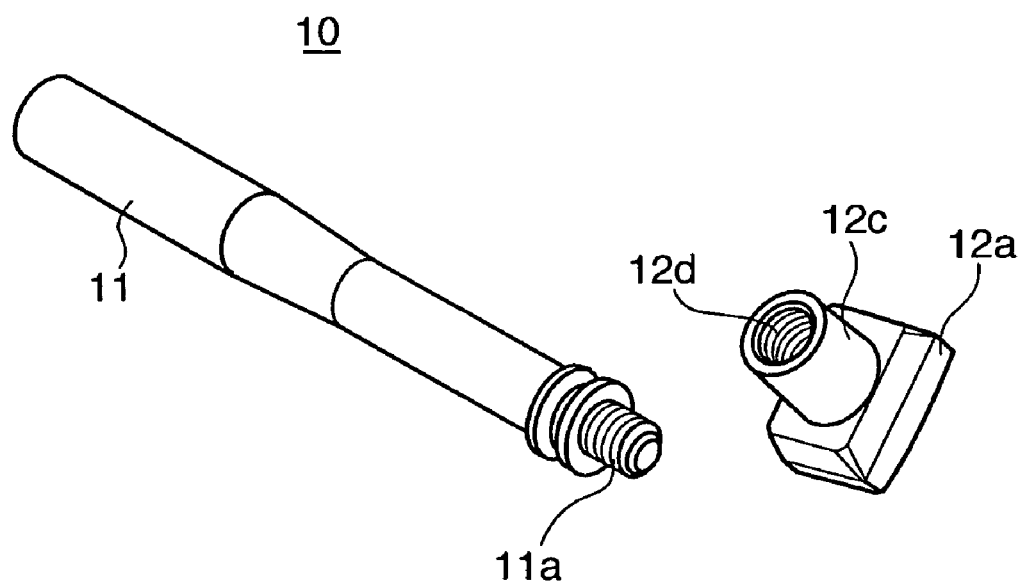

FIGS. 1A and 1B depicts schematic perspective views showing a constitution of a cleaning device 10 according to an embodiment of the invention.

In FIG. 1A, the cleaning device 10 includes a cylindrical supporting member 11, with which a user supports the cleaning device 10 mainly in removing dust, and a cleaning member 12 provided at a tip of the supporting member 11.

The cylindrical supporting member 11 is made of a relatively hard member such as metal or resin. As shown in FIG. 1B, a male thread portion 11a is formed at one tip thereof. The cleaning member 12 is made of silicone or rubber such as EPDM and has portions indicated by 12a to 12c. The portion indicated by 12a is a cleaning portion that is a relatively soft elastic portion with rubber hardness of 1° to 50°.

The cleaning portion 12a is made of substantially rectangular rubber and removes dust (an alien substance) on a surface of a cover glass of a solid image sensing device or a surface of an optical filter in a camera using cohesiveness of the rubber. The cohesiveness of the soft rubber is realized by causing fats and oils or the like contained in a rubber material to seep out according to so-called bleed. The fats and oils are effective for attracting dust. Reference sign 12c denotes a connecting portion (an attaching/detaching portion) in which a female thread 12d, in which the male thread portion 11a at the tip of the supporting member 11 is screwed, is formed. The connecting portion 12c is made of rubber with hardness larger than hardness of the cleaning portion 12a, for example, rubber with hardness of more than 40°.

The cleaning member 12 according to this embodiment is integrally formed by two-color molding of two portions with different kinds of hardness, that is, the cleaning portion 12a with low hardness and the connecting portion 12c with high hardness. Although the cleaning member 12 is integrally formed by two-color molding in this embodiment, the cleaning member 12 may be integrally formed using plural kinds of molding materials or may be formed integrally using, for example, an ultraviolet curing material and a heat curing material to make hardness of the cleaning portion 12a and hardness of the connecting portion 12c different. Note that, since a specific molding method for these molding materials is a publicly-known technique, an explanation of the method is omitted.

In this way, according to the cleaning device 10 in this embodiment, the cleaning member 12 can be attached to and detached from the supporting member 11. Thus, in a case where cohesiveness of the cleaning member 12 falls or a surface 12b of the cleaning portion 12a is soiled, it is possible to maintain a cleaning effect by replacing the cleaning member 12.

The connecting portion 12c engaging with the male thread portion 11a of the supporting member 11 is made of resin with high hardness (hard resin). Accordingly, even if the cleaning portion 12a is soft and has low rubber hardness in order to be convenient for attracting dust, the cleaning member 12 and the supporting member 11 are never separated carelessly.

Note that the cleaning surface 12b of the cleaning portion 12a of the cleaning member 12 forms a substantially cylindrical surface with a center thereof slightly projected in an R-shape with respect to peripheries thereof. Although a suitable numerical value of a curvature of the surface 12b is different depending on elasticity, that is, the hardness of the cleaning portion 12a, a curvature of R200 to R1000 is preferable.

As the hardness of the cleaning portion 12a becomes smaller, a larger force is required for pulling and separating the cleaning portion 12a from a portion to be cleaned after bringing the cleaning portion 12a into contact with the surface of the portion to be cleaned. In other words, upon cleaning the portion to be cleaned, if a shape of a surface of the portion to be cleaned and the surface 12b coming into contact with the surface is planar or recessed, when it is attempted to separate the cleaning portion 12a after closely attaching the cleaning portion 12a to the surface of the portion to be cleaned, a sucker-like effect is caused to make it difficult to separate the cleaning portion 12a from the closely-attached state. Therefore, the surface 12b of the cleaning portion 12a is formed in the slightly projected R-shape to prevent the sucker-like effect from being caused and make it easy to separate the cleaning portion 12*a* from the portion to be cleaned, after that an alien substance of the portion has adhered to the surface 12*b*.

Figure 5:
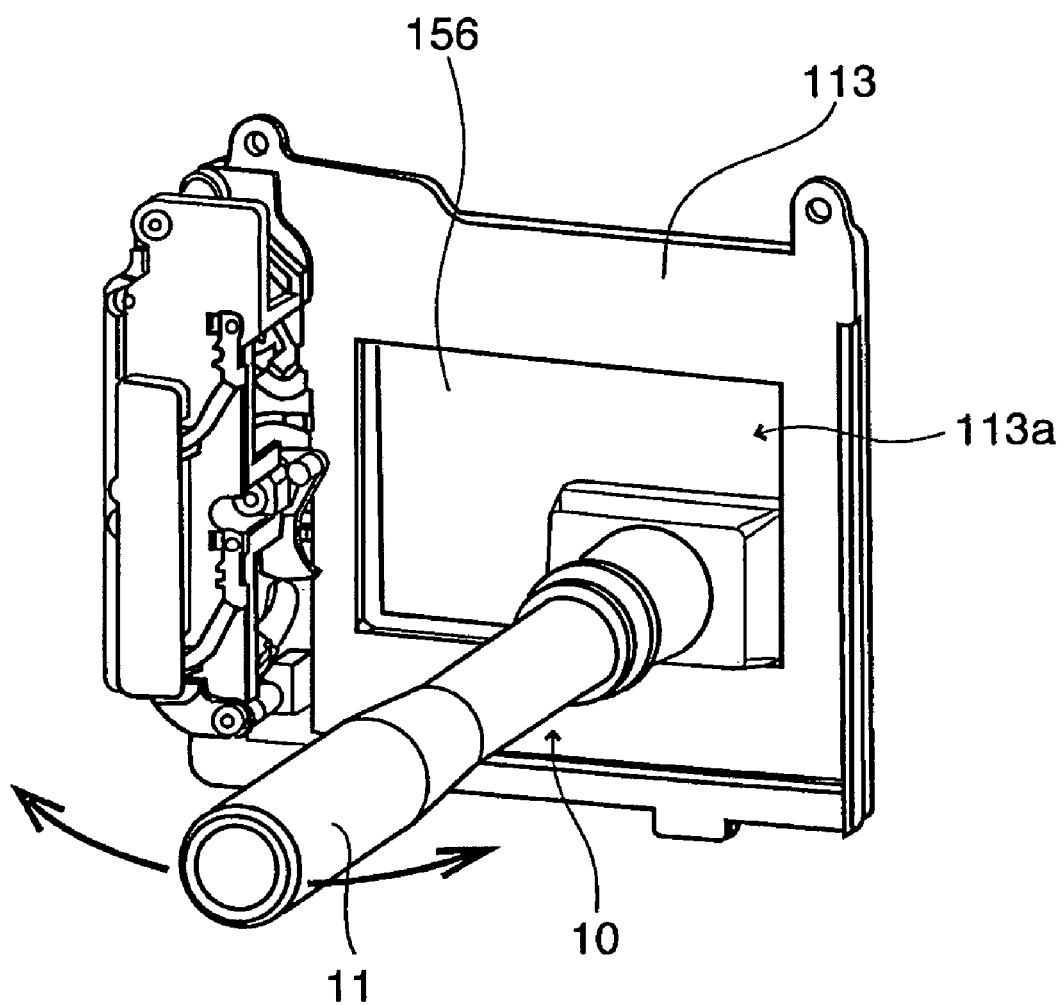
FIG. 5 depicts a main part perspective view for explaining a state in which the cleaning device according to the embodiment is brought into abutment against a surface of the LPF through a shutter aperture.

At the time of cleaning using the cleaning device according to this embodiment, the surface 12*b* of the cleaning portion 12*a* is brought into abutment against an optical member with a substantially plane surface shape like the portion to be cleaned such as a cover glass of a solid image sensing device or an optical filter in a camera. After then, as described later, the supporting member 11 is lightly pressed against the surface of the portion to be cleaned, whereby a cylindrical surface of the soft elastic cleaning portion 12*a* is slightly crushed and comes into contact with the surface of the portion. Moreover, the supporting member 11 is slightly swung in a circumferential direction of the cylindrical surface in the pressed state (FIG. 5). Consequently, the cylindrical surface of the surface 12*b* of the cleaning portion 12*a* and the surface of the portion to be cleaned (the optical member) sufficiently come into contact with each other. In this way, it is possible to remove an alien substance adhering to the surface of the portion to be cleaned by sticking the alien substance to the surface 12*b*.

Since the cleaning portion 12*a* is made of a rubber material with relatively low hardness, the cleaning portion 12*a* functions as a shock absorber. A pressure pressing the supporting member 11 to the portion to be cleaned is not directly applied to the surface of the portion to be cleaned. Consequently, it is possible to remove an alien substance adhering to the cover glass, the optical filter, or the like while preventing damages to the inside of the optical device and the surface of the optical member due to the pressure by the supporting member 11 during the cleaning operation.

Figure 2:
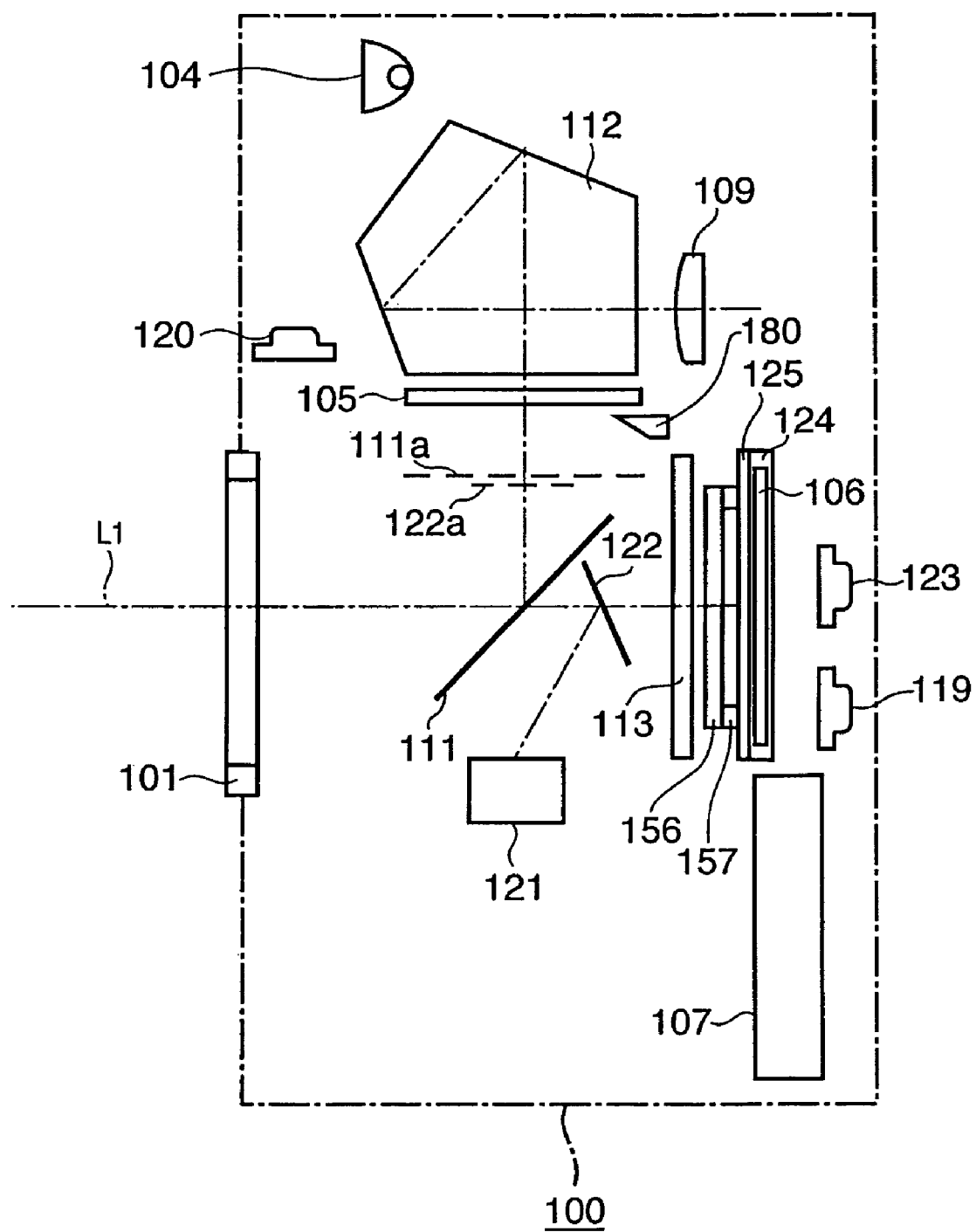
FIG. 2 depicts a side sectional view for explaining a constitution of a digital camera that is an example of an optical device that is an object device from which an alien substance is removed using the cleaning device according to the embodiment.

FIG. 2 depicts a side sectional view for explaining a constitution of a digital camera (hereinafter simply referred to as camera) 100 that is an example of an optical device that is an object device from which dust adhering to a surface of a cover glass of a solid image sensing device, a surface of an optical filter, or the like is removed using the cleaning device 10 according to the embodiment of the invention.

The camera 100 is a CCD camera (a single-lens reflex camera) using a solid image sensing device 106 such as a CCD or a CMOS sensor. The camera 100 drives the solid image sensing device 106 continuously or once to obtain an image signal representing a moving image or a still image. The solid image sensing device 106 is an area sensor of a type for converting light into an electric signal for each pixel, accumulating charges corresponding to an amount of the light, and reading out the charges.

In FIG. 2, reference numeral 100 denotes a camera body and 101 denotes a mount mechanism. A not-shown photographing lens (which includes an iris and an imaging optical system and is detachable) is electrically and mechanically connected to a body of the camera 100 via the mount mechanism 101. In such a digital single-lens reflex camera, it is possible to obtain photographed images at various angles of view by replacing a photographing lens used for photographing to lenses having different focal lengths. The solid image sensing device 106 is housed in a package 124. The package 124 holds the solid image sensing device 106 in a sealed state using a cover glass 125. An optical low-pass filter 156 (hereinafter abbreviated as LPF 156), which limits a cutoff frequency of the imaging optical system such that a spatial frequency component higher than necessary of an object image is not transmitted onto the solid image sensing device 106, is provided in an optical path L1 leading from the imaging optical system in the not-shown photographing lens to the solid image sensing device 106. An infrared cut filter is also mounted to the imaging optical system. Moreover, a space between the cover glass 125 and the LPF 156 are sealed by a sealing member 157 such as a couple-face tape. Consequently, dust on the outside of the camera 100 or the inside of the camera 100 is prevented from entering between the LPF 156 and the cover glass 125.

An object image caught by the solid image sensing device 106 is displayed on a display 107. The display 107 is attached to the back of the camera 100. In photographing or the like, a user can directly observe an image of an object of the photographing with the display 107. It is convenient to form the display 107 with an organic EL spatial modulation device, a liquid crystal spatial modulation device, a spatial modulation device using electrophoresis of particulates, or the like because power consumption is small and the display 107 is made thin. The solid image sensing device 106 is a CMOS process compatible sensor (hereinafter abbreviated as CMOS sensor) that is one of amplifying solid image sensing devices. As one of characteristics of the CMOS sensor, it is possible to form a MOS transistor in an area sensor unit and peripheral circuits (see FIG. 3) such as a driving circuit, an A/D circuit, and an image processing circuit of an image sensing device in an identical process. With the characteristic, it is possible to significantly reduce the number of masks and processes compared with a CCD. It is also possible to access to an arbitrary pixel at random, read out with pixels thinned out for display on the display 107, and display an image at a high display rate on a real time basis. The solid image sensing device 106 according to this embodiment can perform operations for outputting an image and outputting a high-definition image to the display 107 using such a characteristic.

A half mirror 111 is a movable mirror for dividing the optical path L1 from the imaging optical system and supplying light to an optical finder. A focusing screen 105 is arranged on an intended imaging surface for an object image. Reference numeral 112 denotes a pentagonal prism. A lens 109 is a lens that a user observes an optical finder image at the time of photographing. The lens 109 is actually constituted by three lenses. The focusing screen 105, the pentagonal prism 112, and the lens 109 constitute a finder optical system. A refractive index of the half mirror 111 is about 1.5 and thickness thereof is 0.5 mm. A movable sub-mirror 122 is provided behind the half mirror 111. The sub-mirror 122 deflects a light beam close to an optical axis of the optical path L1 among light beams, which are transmitted through the half mirror 111, to a focus detecting portion 121. The sub-mirror 122 rotates around a rotation axis provided in a holding member (not shown) of the half mirror 111 and moves in association with movement of the half mirror 111. Note that the focus detecting portion 121 performs focus detection according to a phase difference detection system.

An optical path dividing system consisting of the half mirror 111 and the sub-mirror 122 can accomplish a first optical path dividing state for leading light to the finder optical system and second optical path dividing states retracted from the photographing optical path L1 in order to lead light beams from a not-shown imaging lens directly to the solid image sensing device 106 (positions indicated by broken lines in FIG. 2: 111*a* and 122*a*).

Reference numeral 104 denotes a movable flash emitting portion (an electric flash), a numeral 113 denotes a focal plane shutter, a numeral 119 denotes a main switch, and a numeral 120 denotes a release button. A mode changeover switch 123 is a switch for setting the camera 100 in a cleaning mode in order to remove an alien substance adhering to the surface of the LPF 156 of the camera 100 or the like using the cleaning device 10. Reference numeral 180 denotes a display portion in the optical finder.

Note that, when the mode changeover switch 123 is operated and the cleaning mode is set, the half mirror 111 and the sub-mirror 122 moves the positions 111a and 122a that are the second optical path dividing state and the focal plane shutter 113 comes into an opened state. This state is called a cleaning mode. Consequently, the user can directly view the surface of the LPF 156 through the aperture of the mount mechanism 101. Therefore, the user can remove the alien substance adhering to the surface of the LPF 156 and the like using the cleaning device 10 in this state.

Figure 3:
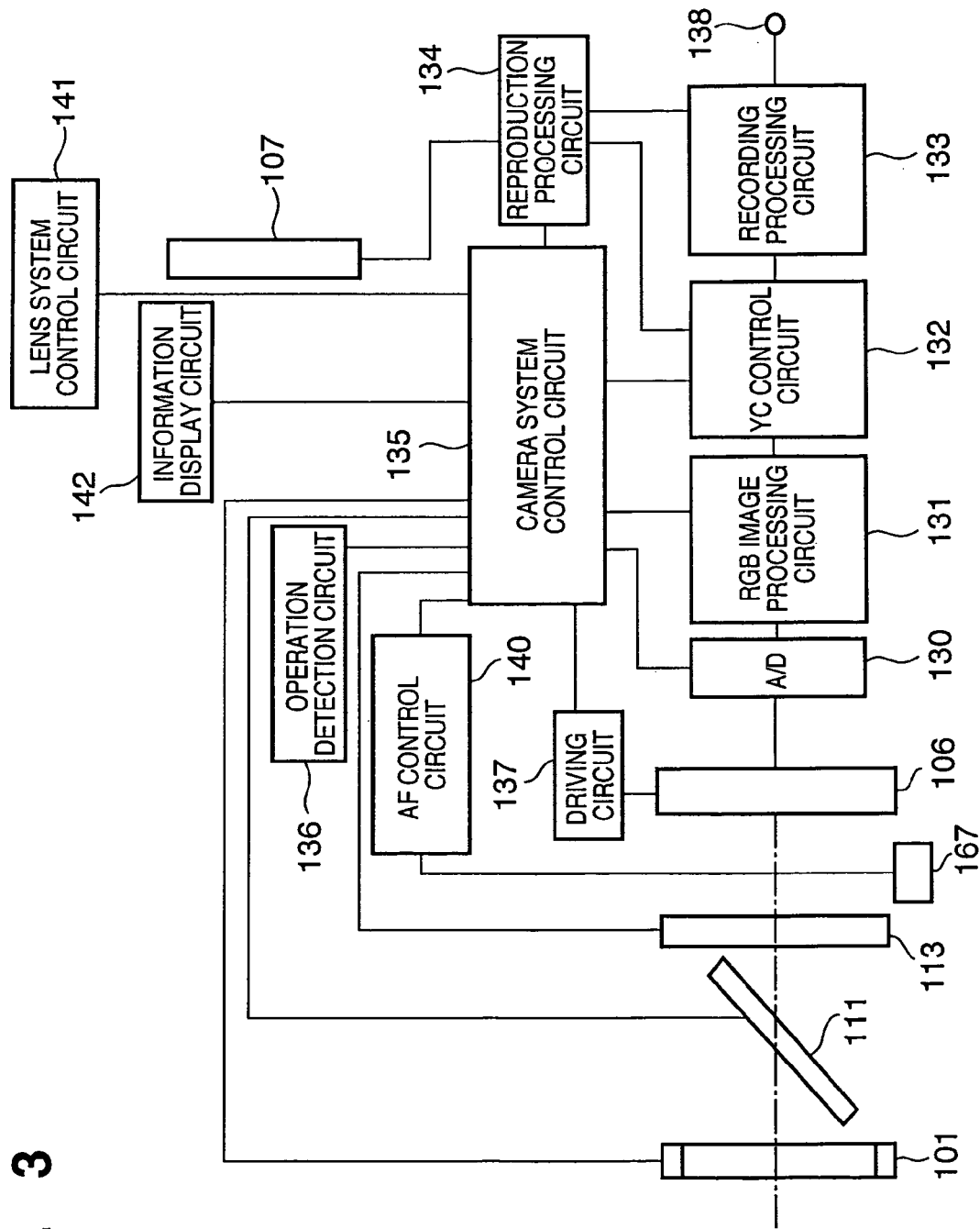
FIG. 3 is a block diagram showing a constitution of a camera according to the embodiment.

FIG. 3 is a block diagram for explaining a constitution of the camera 100 according to this embodiment.

First, portions related to image sensing and recording of an object image are explained. As functions (mechanisms) of the camera 100, the camera 100 has an image sensing mechanism, an image processing mechanism, a recording/reproduction mechanism, and a control mechanism for controlling overall operations. The image sensing mechanism includes the focusing optical lens of the not-shown photographing lens, the solid image sensing device 106, and the like. The image processing mechanism includes an A/D converter 130, an RGB image processing circuit 131, and a YC processing circuit 132. The recording/reproduction mechanism includes a record processing circuit 133 and a reproduction processing circuit 134. The control mechanism includes a camera system control circuit 135, an operation detecting circuit 136, and an image sensing device driving circuit 137. A connection terminal 138 is a standardized terminal for making connection to an external device such as a computer device and transmitting and receiving data between the camera 100 and the external device. These electric circuits are driven by a not-shown small fuel cell (battery).

The image sensing mechanism includes an optical processing mechanism that focuses light from an object on an image sensing surface of the solid image sensing device 106 via the focusing optical system. The image sensing mechanism adjusts the iris of the not-shown photographing lens and, if necessary, a mechanical shutter 113 to expose the solid image sensing device 106 with an object light of an appropriate light amount. The image sensing device 106 has a total number of pixels of about 10 million consisting of 3700 square pixels arranged in a long side direction and 2800 square pixels arranged in a short side direction. Each pixel is formed by a so-called Bayer array in which color filters of R (red), G (green), and B (blue) are alternately arranged to form one pixel. In the Bayer array, filter elements of G, which an observer tends to feel vividly when the observer sees an image, are arranged more than that of R and B to improve total image performance. In general, in an image processing circuit using the solid image sensing device 106 of this system, a luminance signal is mainly generated from G and a color signal is generated from R, G, and B.

An image signal read out from the solid image sensing device 106 is converted into a digital image signal by the A/D converter 130 and, then, supplied to the RGB image signal processing circuit 131 that applies various kinds of processing to the digital image signal. The A/D converter 130 is a signal converting circuit that converts an image signal from each exposed pixel into a digital signal corresponding to an amplitude of the image signal, for example, a digital signal of 10 bits and outputs the digital signal. After then, image signal processing is executed as digital processing. An image signal processing portion obtains image signals of desired formats from R, G, and B digital signals. The image signal processing portion further converts R, G, B color signals into a YC signal and the like represented by a luminance signal Y and color difference signals (R−Y) and (B−Y). A constitution of the image signal processing circuit is explained below.

The RGB image processing circuit 131 is a signal processing circuit that processes a digital image signal of 3700×2800 pixels inputted from the solid image sensing device 106 via the A/D converter 130. The RGB image processing circuit 131 has a white balance circuit, a gamma correction circuit, and an interpolation operation circuit that increases resolution through an interpolation operation. The YC processing circuit 132 is a signal processing circuit that generates a luminance signal Y and color difference signals R−Y and B−Y from an RGB signal. The YC processing circuit 132 includes a high-frequency luminance signal generating circuit that generates a high-frequency luminance signal YH, a low-frequency luminance signal generating circuit that generates a low-frequency luminance signal YL, and a color difference signal generating circuit that generates the color difference signals R−Y and B−Y. The luminance signal Y is formed by synthesizing the high-frequency luminance signal YH and the low-frequency luminance signal YL.

The recording/reproduction mechanism includes a processing circuit that performs storage of an image signal in a memory and output of the image signal to the display 107. The recording processing circuit 133 executes writing processing and readout processing for writing the image signal in and reading out the image signal out of the memory. The reproduction processing circuit 134 reproduces the image signal read out from the memory and displays an image on the display 107. The recording processing circuit 133 includes a compression/expansion circuit that compresses YC signals representing a still image or a moving image in a predetermined compression format and expands compressed data when the compressed data is read out. The compression/expansion circuit includes a frame memory or the like for signal processing. The YC signals from the YC processing circuit 132 are accumulated in the frame memory for each frame and read out and compression-coded for every plural blocks. The encoding is performed by, for example, subjecting an image signal for each block to two-dimensional orthogonal transformation, normalization, and Huffman coding. The reproduction processing circuit 134 is a circuit that subjects the luminance signal Y and the color difference signals R-Y and B-Y to matrix transformation to convert the signals into, for example, an RGB signal. The signals converted by the reproduction processing circuit 134 is displayed on the display 107 and reproduced as a visible image. The reproduction processing circuit 134 and the display 107 may be connected via radio communication means such as Bluetooth. With such a constitution, it is possible to monitor an image photographed by the camera 100 even from a remote position.

On the other hand, the control mechanism includes an operation detecting circuit 136 that detects operation of the release button 120, the mode changeover switch 123, and the like, a camera system control circuit 135 that controls portions including the half mirror 111 and the sub-mirror 122 in response to an operation detection signal outputted from the operation detecting circuit 136 and generates and outputs a timing signal or the like at the time of image sensing, a solid image sensing device driving circuit 137 that generates a driving signal for driving the solid image sensing device 106 under the control of the camera system control circuit 135, and an information display circuit 142 that controls the display portion 180 (FIG. 2) in the optical finder. The control mechanism controls to drive the image sensing mechanism, the image processing mechanism, and the recording/reproduction mechanism, respectively, in response to an user's operation. For example, the control mechanism detects depression of the release button 120, controls driving of the solid image sensing device 106, an operation of the RGB image processing circuit 131, compression processing for the recording processing circuit 133, and the like and controls a displaying status of the display portion 180, which displays information in the optical finder, with the information display circuit 142.

Portions related to focus adjustment in the camera 100 are explained.

An AF control circuit 140 and a lens system control circuit 141 are further connected to the camera system control circuit 135. These circuits communicate data required for respective kinds of processing each other through the camera system control circuit 135. The AF control circuit 140 obtains a signal from a sensor 167 for focus detection in a focus detection field set in a predetermined position on a photographing screen, generates a focus detection signal on the basis of the signal, and detects a focusing state of the focusing optical system of the not-shown photographing lens. When defocus is detected, the AF control circuit 140 converts the defocus into a driving amount of a focusing lens that is an element of a part of the focusing optical system and transmits the driving amount to the lens system control circuit 141 via the camera system control circuit 135. Concerning a moving object, the AF control circuit 140 instructs a focusing lens driving amount according to a result of estimating an appropriate lens position taking into account a time lag from the release button 120 is depressed until actual image sensing control is started. In a case where luminance of an object to be photographed is low and it is judged that sufficient focus detection accuracy is not obtained, the AF control circuit 140 illuminates the object to be photographed with light from the flash emitting portion 104 or a not-shown white LED or fluorescent tube. When the lens system control circuit 141 receives the driving amount of the focusing lens, the lens system control circuit 141 performs an operation, for example, moves the focusing lens in the direction of the optical path L1 (FIG. 2) with a not-shown driving mechanism in the photographing lens to focus on the object to be photographed. When it is detected that the camera is focused on the object to be photographed by the AF control circuit 140, this information is communicated to the camera system control circuit 135. At this point, when the release button 120 is depressed, as described above, the image sensing control by the image sensing system, the image processing system, and the recording/reproduction system is executed.

An operation for removing an alien substance adhering to the surface of the LPF 156 of the camera constituted in this way using the cleaning device 10 according to this embodiment is explained with reference to FIGS. 4 to 6.

Figure 4:
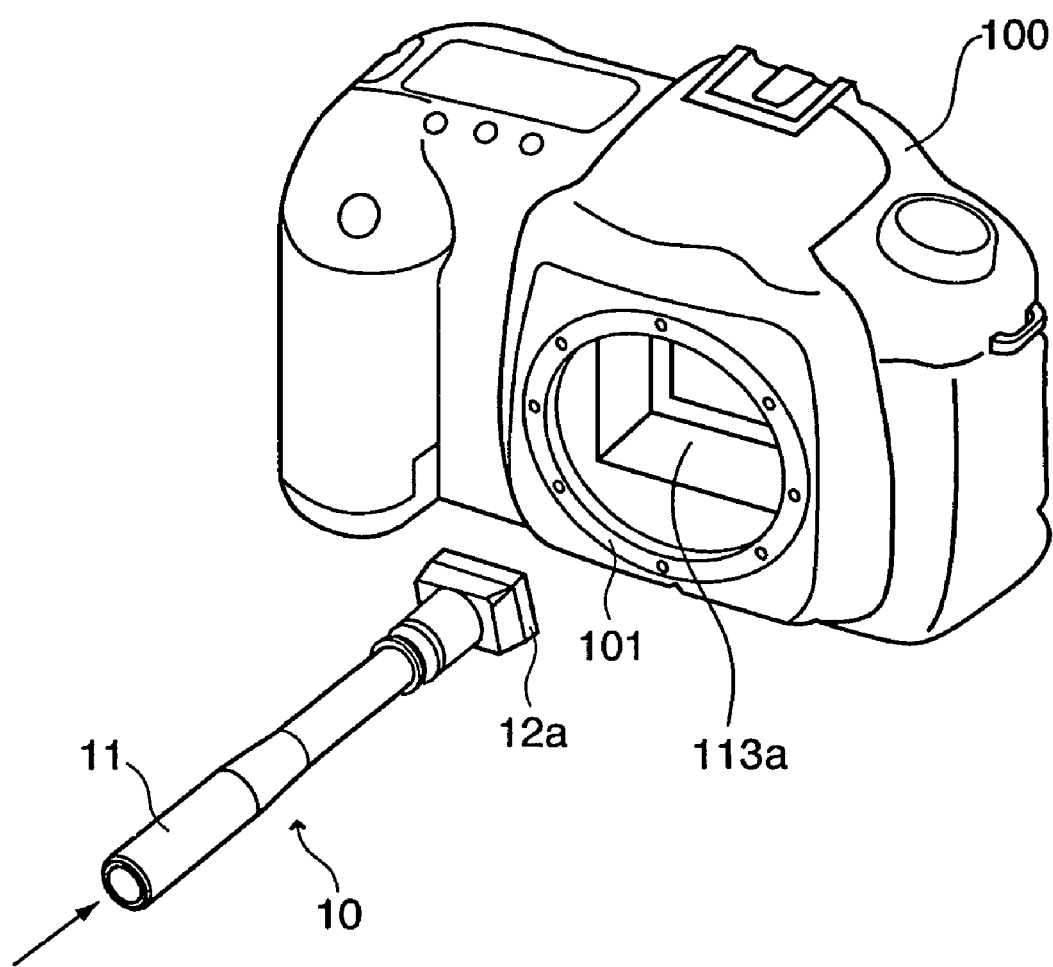
FIG. 4 depicts a schematic perspective view for explaining a state of removing an alien substance adhering to a surface of an LPF using the cleaning device in a state in which the camera is in a cleaning mode.

FIG. 4 depicts a schematic perspective view for explaining a case in which an alien substance adhering to the surface of the LPF 156 is removed using the cleaning device 10 according to this embodiment in a state in which the mode changeover switch 123 is operated and the camera 100 is in a cleaning mode.

The cleaning portion 12a of the cleaning device 10 is made of a relatively soft member having hardness of 1° to 50° as described above. Thus, a bleed phenomenon in which fats and oils or the like contained in rubber material seep out is observed in a longer time as the rubber material is softer. Therefore, before cleaning, it is preferable to remove excess fats and oils or the like adhering to the surface 12b of the cleaning portion 12a by wiping off the fats and oils on the surface 12b with a "degreasing sheet (paper)" (not shown) generally available on the market.

First, upon removing the alien substance adhering to the surface of the LPF 156 and the like, it is desirable to do the cleaning operation, after removing dust, fats and oils or the like on the surface 12b of the cleaning portion 12a using a transfer material described later, the "degreasing sheet (paper)", or the like.

In FIG. 4, a user inserts the cleaning device 10 in a direction of an arrow in the figure through an aperture 113a, which is formed when the focal plane shutter 113 comes into an opened state, from the aperture of the mount mechanism 101 of the camera 100 in a state in which the user grips or holds the supporting member 11 of the cleaning device 10.

FIG. 5 depicts a main part perspective view showing a state in which the surface 12b of the cleaning portion 12a of the cleaning device 10 comes into contact with the surface of the LPF 156 through the shutter aperture 113a.

As shown in FIG. 5, an user brings the surface 12b of the cleaning portion 12a into contact with the surface of the LPF 156 aiming at four corners of the surface of the LPF 156. In this state, the user swings the supporting member 11 in a direction of an arrow in the FIG. 5 along a circumferential direction of the surface 12b of the projected R-shaped cylindrical surface of the cleaning portion 12a. Consequently, the surface of the LPF 156 and the surface 12b of the cleaning portion 12a are completely brought into contact with each other. Since the surface 12b is formed as a cylindrical surface, the surface 12b is never attracted to the surface of the LPF 156 like a sucker to make it difficult to separate the cleaning portion 12a.

Figure 6A:
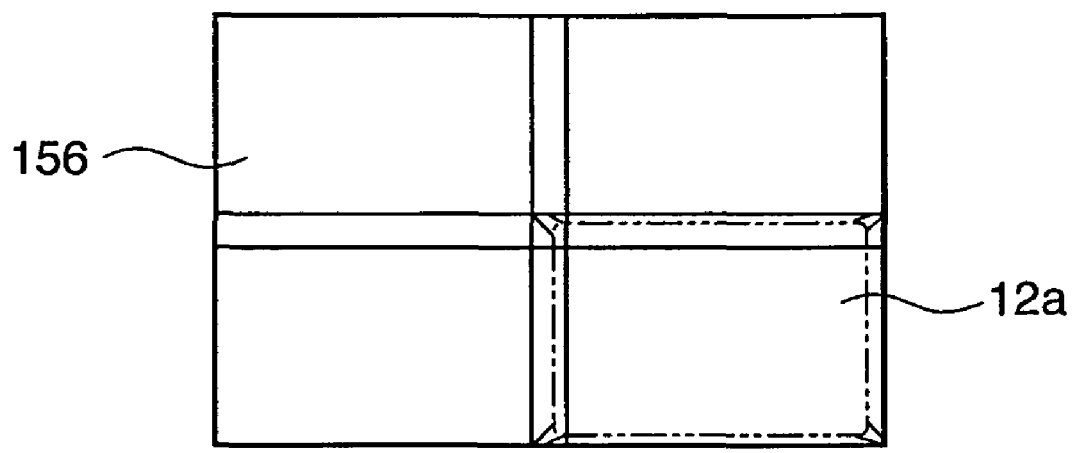
FIGS. 6A and 6B depict plan views for explaining a cleaning area on a surface of a cleaning portion of the cleaning device according to the embodiment.
Figure 6B:
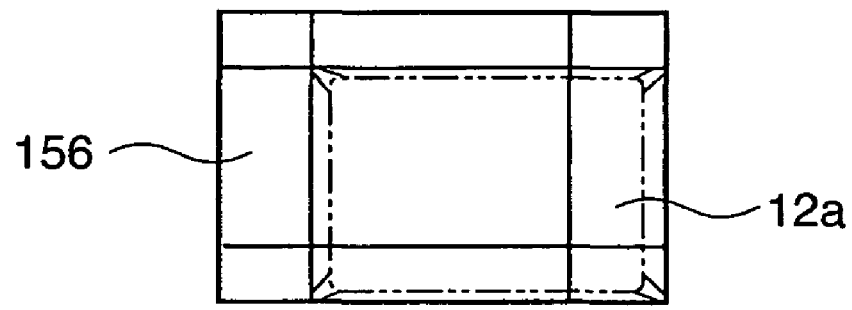

FIGS. 6A and 6B depict plan views for explaining a cleaning area of cleaning for an image frame format of a lens replaceable digital single-lens reflex camera by the surface 12b of the cleaning portion 12a of the cleaning device 10 according to this embodiment.

FIG. 6A shows a case of an image frame format of a digital single-lens reflex camera with a size of about 36×24 mm equivalent to a 135 format of a silver salt film. In this format, the cleaning portion 12a of the cleaning device 10 is set to a size slightly larger than equally divided four parts of an image frame of the LPF 156 in the figure. In this embodiment, the size is about 19×13 mm. Therefore, in the digital single-lens reflex camera of this format, as described above, the user brings the surface 12b of the cleaning portion 12a of the cleaning device 10 into abutment against the surface of the LPF 156 aiming at the four corners of the shutter aperture 113a, respectively, to swing the supporting member 11. It is possible to clean almost the entire area of the LPF 156 by performing such operation for the corners four times in total. Note that, as described above, since the surface 12b is formed in a substantially rectangular shape, it is possible to perform positioning of the surface 12b with the four corners of the shutter opening 113a or the LPF 156.

FIG. 6B shows a case of an image frame format of a digital single-lens reflex camera with a size of about 24×16 mm equivalent to an APS-C format. In this format, the cleaning portion 12a of the cleaning device 10 is set to a size slightly smaller than an image frame of the LPF 156 in the figure. In this embodiment, the size is about 19×13 mm. Therefore, in the digital single-lens reflex camera of the format shown in FIG. 6B, as described above, the user brings the surface 12b of the cleaning portion 12a of the cleaning device 10 into abutment against the surface of the LPF 156 aiming at the four corners of the surface of the LPF 156, respectively, to swing the supporting member 11. It is possible to clean almost the entire area of the LPF 156 by performing such operation for the corners four times in total. Note that, as described above, since the surface 12b is formed in a substantially rectangular shape, it is possible to perform positioning of the surface 12b with the four corners of the shutter opening 113a or the LPF 156.

In this way, in this embodiment, the surface 12b of the cleaning portion 12a of the cleaning device 10 is formed in a substantially rectangular shape and a size of the surface 12b is set to be slightly larger than the equally divided four parts of the frame equivalent to the 135 format and slightly smaller than the frame equivalent to the APS-C format. Consequently, in the use of the common cleaning portion 12, it is possible to clean areas of the surface of the LPF 156 ranging from that of the lens replaceable digital single-lens reflex camera with the frame equivalent to the 135 format to that of the lens replaceable digital single-lens reflex camera with the frame equivalent to the APS-C format by performing the cleaning operation four time at the minimum.

In recent years, a lens replaceable digital single-lens reflex camera of a format other than the format from the frame equivalent to the 135 format to the frame equivalent to the APS-C format, for example, a lens replaceable digital single-lens reflex camera of a four thirds standard is sold. For this standard of about 18×13.5 mm size, it is possible to separately prepare the cleaning member 12 having the cleaning portion 12a of a small size, for example, 12×9 mm and mounting the cleaning member 12 on the supporting member 11 with the female thread portion 12d of the connecting portion 12c.

It is also possible to prepare plural kinds of the cleaning portion 12a having degrees of hardness different from one another and select and replace the cleaning portion 12a appropriately according to an environment of use such as temperature and humidity.

Figure 7:
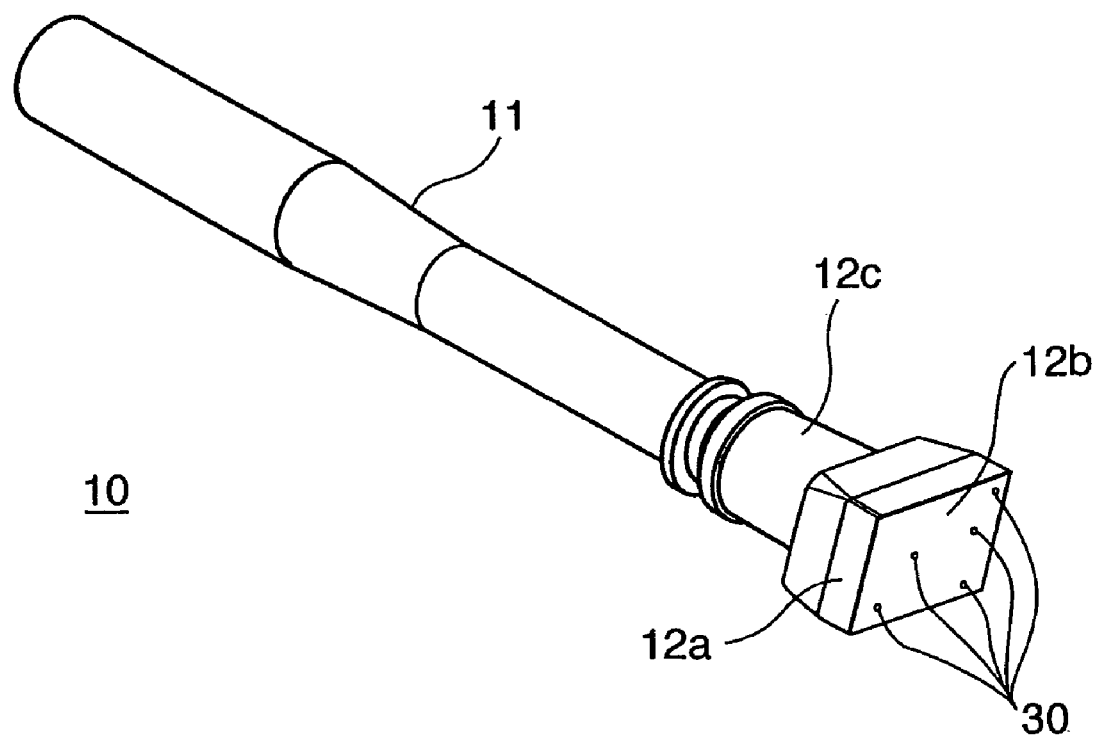
FIG. 7 is a schematic diagram for explaining removal of an alien substance adhering to the cleaning portion of the cleaning device according to the embodiment.

FIG. 7 is a schematic diagram for explaining an example of a method of removing an alien substance from the surface 12b of the cleaning portion 12a in a state in which the alien substance is stuck to the cleaning portion 12a of the cleaning device 10 as described above.

In the figure, an alien substance 30 removed from the surface of the LPF 156 and stuck to the surface 12b of the cleaning portion 12a is transferred to a sheet-like transfer material (e.g., "Tucky" manufactured by Otaka Rubber Industry) having cohesiveness higher than that of the surface 12b of the cleaning portion 12a. Consequently, the alien substance 30 is removed from the surface 12b of the cleaning portion 12a.

The user presses the surface 12b of the cleaning portion 12a of the cleaning device 10 against the transfer material (not shown) from the state shown in FIG. 7. Since the transfer material has cohesiveness higher than the surface 12b of the cleaning portion 12a, the alien substance 30 adhering to the surface 12b is stuck to the surface of the transfer material. Consequently, the alien substance adhering to the surface 12b of the cleaning portion 12a can be removed, the cleaning portion 12a is cleaned, and the surface 12b of the cleaning portion 12a is returned to an original state in which an alien substance such as no dust adheres to the surface 12b.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This patent application claims priority from Japanese Patent Application No. 2004-359120 filed on Dec. 10, 2004, and 2004-362054 filed on Dec. 14, 2004, which are hereby incorporated by references herein.

What is claimed is:

1. A cleaning device for removing an alien substance adhering to a surface of an optical member that is exposed in a state of which the optical member is viewed through an aperture of a lens mount, the cleaning device comprising:
   a supporting member configured to be supported by a user; and
   a cleaning member having a thread portion detachably attachable to one end of the supporting member and a cleaning portion including an adhesive surface that is a rectangular shape, on an opposite side of the thread portion, configured to adhere to an alien substance for removing the alien substance,
   wherein at least the thread portion and the cleaning portion are integrally formed by elastic materials having different degrees of hardness, the cleaning portion has the hardness of 1 to 50 degrees, and the adhesion of the cleaning portion is realized by causing oil contained in the elastic material to seep out according to bleed.

2. The cleaning device according to claim 1, wherein the cleaning member is made of EPDM or silicone.

3. The cleaning device according to claim 1, wherein the hardness of the thread portion is higher than the hardness of the cleaning portion.

4. The cleaning device according to claim 1, wherein the hardness of the thread portion is equal to or higher than 40 degrees.

5. The cleaning device of claim 1, wherein the thread portion and the cleaning portion are made of materials of a same type having degrees of hardness different from each other.

* * * * *